US007754632B2

(12) United States Patent
Delmotte et al.

(10) Patent No.: US 7,754,632 B2
(45) Date of Patent: Jul. 13, 2010

(54) LOW-LUMINOUS-TRANSMITTANCE GLASS

(75) Inventors: Laurent Delmotte, Jumet (BE); Veronique Dieu, Jumet (BE); Marc Van Den Neste, Jumet (BE)

(73) Assignee: AGC Glass Europe, Brussels (BE)

( * ) Notice: Subject to any disclaimer, the term of this patent is extended or adjusted under 35 U.S.C. 154(b) by 959 days.

(21) Appl. No.: 10/568,037

(22) PCT Filed: Aug. 11, 2004

(86) PCT No.: PCT/EP2004/051774

§ 371 (c)(1),
(2), (4) Date: Aug. 16, 2006

(87) PCT Pub. No.: WO2005/016840

PCT Pub. Date: Feb. 24, 2005

(65) Prior Publication Data

US 2007/0191205 A1 Aug. 16, 2007

(30) Foreign Application Priority Data

Aug. 13, 2003 (BE) ................................ 2003/0446

(51) Int. Cl.
*C03C 3/087* (2006.01)

(52) U.S. Cl. .......................................... 501/71; 501/70

(58) Field of Classification Search .................. 501/70, 501/71

See application file for complete search history.

(56) References Cited

U.S. PATENT DOCUMENTS 5,352,640 A * 10/1994 Combes et al. ............... 501/71
5,545,596 A * 8/1996 Alvarez Casariego et al. . 501/71
5,582,455 A * 12/1996 Casariego et al. ........ 296/146.2
5,877,103 A 3/1999 Dupont et al.
5,985,780 A * 11/1999 Alvarez Casariego et al. . 501/71
RE37,514 E * 1/2002 Sasage et al. ................. 501/71
6,413,893 B1 * 7/2002 Shelestak et al. .............. 501/71
6,531,422 B1 * 3/2003 Casariego et al. ............. 501/71
7,005,182 B1 * 2/2006 Hecq et al. .................. 428/336
7,162,892 B2 * 1/2007 Smith et al. .................. 65/99.4
2003/0078155 A1 * 4/2003 Landa et al. .................. 501/71
2003/0083188 A1 * 5/2003 Seto et al. ..................... 501/71
2004/0038799 A1 * 2/2004 Landa et al. .................. 501/70
2004/0110625 A1 * 6/2004 Smith et al. ................... 501/72
2004/0157721 A1 * 8/2004 Foguenne et al. ............. 501/70
2004/0186001 A1 * 9/2004 Seto et al. ..................... 501/70

FOREIGN PATENT DOCUMENTS

JP 2000219534 8/2000

* cited by examiner

*Primary Examiner*—Karl E Group
*Assistant Examiner*—Elizabeth A Bolden
(74) *Attorney, Agent, or Firm*—Oblon, Spivak, McClelland, Maier & Neustadt, L.L.P.

(57) ABSTRACT

The glass according to the invention has a soda-lime type composition to which are added colouring elements present in the following proportions by weight:

| | |
|---|---|
| $Fe_2O_3$ | 1.1 to 1.5% (total iron in the composition) |
| Co | 150 to 200 ppm |
| $Cr_2O_3$ | 25 to 100 ppm |
| Se | 10 to 50 ppm |
| MnO | less than 600 ppm |
| $TiO_2$ | less than 0.1% |

the constituents of the composition, especially the coloured elements, being selected in such proportions that the luminous transmittance at a thickness of 4 mm, TLA4, is less than 20%, and the energetic transmittance, TE4 (Moon), is less than 20%.

14 Claims, No Drawings

LOW-LUMINOUS-TRANSMITTANCE GLASS

CROSS-REFERENCE TO RELATED APPLICATIONS

This application is the national stage entry of International Application No. PCT/EP/2004/051774, filed Aug. 11, 2004, which claims priority to Belgian Application No. 2003/0446, filed Aug. 13, 2003, the disclosures of both of which are hereby incorporated by reference.

BACKGROUND OF THE INVENTION

This invention relates to compositions of soda-lime type glass with low luminous transmittance; typical transmissions for a 4 mm thick sheet do not exceed 20%.

The expression "soda-lime glass" is used here in the broad sense and relates to any glass containing the following constituents (percentages by weight):

| | |
|---|---|
| $SiO_2$ | 66 to 75% |
| $Na_2O$ | 10 to 20% |
| CaO | 5 to 15% |
| MgO | 0 to 5% |
| $Al_2O_3$ | 0 to 5% |
| $K_2O$ | 0 to 5% |

This type of glass is very widely used in glazing for buildings or motor vehicles, for example. It is usually manufactured in the form of a ribbon by a float process. The ribbon can then be cut into sheets which can then be curved or undergo a treatment to strengthen their mechanical properties, such as thermal tempering.

It is generally necessary to refer the optical properties of a sheet of glass to a standard illuminant. In this description, two standard illuminants are used: illuminant C and illuminant A as defined by the International Commission on Illumination (CIE). Illuminant C represents average daylight with a colour temperature of 6 700 K. This illuminant is especially useful for evaluating the optical properties of glazing for buildings. Illuminant A represents the radiation from a Planck radiator at a temperature of around 2 856 K. This illuminant simulates the light emitted by automobile headlamps and is generally used to evaluate the optical properties of automotive glazing. The International Commission on Illumination also published a document entitled "Colorimetry, Official Recommendations of the CIE" (May 1970) describing a theory according to which the colorimetric coordinates for light of each wavelength in the visible spectrum are defined so that they can be represented on a diagram with orthogonal x and y axes, known as the CIE 1931 tri-chromatic diagram. This tri-chromatic diagram shows the region representing the light of each wavelength (expressed in nanometres) of the visible spectrum). This region is known as the "spectrum locus" and light that has coordinates on this spectrum locus is said to have 100% excitation purity for the appropriate wavelength. The spectrum locus is closed by a line known as the line of purples which joins the points of the spectrum locus whose coordinates correspond to the wavelengths 380 nm (violet) and 780 nm (red). The area between the spectrum locus and the purples line is the area available for the tri-chromatic coordinates of any visible light. The coordinates of the light emitted by illuminant C, for example, correspond to x=0.3101 and y=0.3162. This point C is considered to represent white light and therefore has an excitation purity of zero for any wavelength. Lines can be drawn from point C towards the spectrum locus at any desired wavelength and any point is located on these lines can be defined not only by its x and y coordinates, but also as a function of the wavelength corresponding to the line on which it is found and its distance from point C in relation to the total length of the wavelength line. Therefore, the hue of the light transmitted by a sheet of coloured glass can be described by its dominant wavelength and its excitation purity expressed as a percentage.

The CIE coordinates of light transmitted by a coloured sheet of glass will depend not only on the composition of the glass but also on its thickness. In this description, and in the claims, all values of excitation purity P and dominant wavelength $\lambda_D$ of the transmitted light are calculated from the specific internal spectral transmittance ($TSI_\lambda$) of a 5 mm thick sheet of glass. The specific internal spectral transmittance of a sheet of glass is governed only by the absorption of the glass and can be expressed by the Beer-Lambert law:

$TSI_\lambda=e^{-E.A^\lambda}$ where $A_\lambda$ is the absorption coefficient of the glass (in $cm^{-1}$) at the wavelength considered and E the thickness of the glass (in cm). As a first approximation, $TSI_\lambda$ can also be represented by the formula $$(I_3+R_2)/(I_1-R_1)$$

where $I_1$ is the intensity of the incident visible light at the first face of the glass sheet, $R_1$ is the intensity of the visible light reflected by that face, $I_3$ is the intensity of the visible light transmitted from the second face of the glass sheet and $R_2$ is the intensity of the visible light reflected back inside the sheet by the second face.

In the following description and the claims, we also use:

- total luminous transmittance for illuminant A (TLA), measured for a thickness of 4 mm (TLA4). This total transmittance is the result of integrating between the wavelengths of 380 and 780 nm the expression: $\Sigma\ T_\lambda.E_\lambda.S_\lambda/\Sigma\ E_\lambda.S_\lambda$ in which $T_\lambda$ is the transmittance at wavelength $\lambda$, $E_\lambda$ is the spectral distribution of illuminant A and $S_\lambda$ is the sensitivity of the normal human eye according to the wavelength $\lambda$.
- the total energetic transmittance (TE), measured for a thickness of 4 mm (TE4). This total transmittance is the result of integrating between the wavelengths of 300 and 2500 nm the expression: $\Sigma\ T_\lambda.E_\lambda/\Sigma\ E_\lambda$ in which $E_\lambda$ is the spectral energy distribution of the sun at 30° above the horizon.
- the selectivity (SE), measured as the ratio of the total luminous transmittance for illuminant A to the total energetic transmittance (TLA/TE).

There is demand for glazing with high light absorption in both buildings and automotive applications. In addition to low luminous transmittance, very low energetic transmittance is also usually required.

The choice of compositions also involves colour transmittance and reflection characteristics. Demand for highly absorbent glass mainly relates to sheets offering good neutrality. This is characterised by the degree of colour purity. A neutral coloration corresponds to a purity well below 10.

Making glass satisfying a set of conditions of the type indicated above involves a particularly delicate choice of colouring materials, especially as, in addition to the performance of glass made with these compositions, there are also conditions affecting the choice of materials that can be used, taking account in particular of the requirements related to the manufacturing techniques. For instance, colouring materials designed to absorb infrared radiation tend to prevent the attainment of uniform temperatures in the baths of the melting furnaces, which are heated from above by radiation.

SUMMARY OF THE INVENTION

The object of the invention is achieved by a soda-lime type glass composition comprising colouring elements in the following proportions by weight:

| | |
|---|---|
| $Fe_2O_3$ | 1.1 to 1.5% (total iron in the composition) |
| Co | 150 to 200 ppm |
| $Cr_2O_3$ | 25 to 100 ppm |
| Se | 10 to 50 ppm |
| MnO | less than 600 ppm |
| $TiO_2$ | less than 0.1% |

the constituents of the composition, especially the coloured elements, being selected in such proportions that the luminous transmittance under a thickness of 4 mm, TLA4, is less than 20%, and the energetic transmittance, TE4 (Moon), is also less than 20%.

In addition to the main constituents listed above, the compositions according to the invention can include first of all constituents that usually take the form of impurities in the proportions conventionally observed, and which come in particular from the raw materials used. These inevitable impurities nevertheless have a very limited influence on the properties of the glasses concerned.

The compositions according to the invention can include additional colouring agents usual in glass such as $CeO_2$, $TiO_2$, $V_2O_5$, NiO . . . .

If each of the constituents of the composition according to the invention is itself known for the type of properties that it can induce, along with any disadvantages of its use, the complexity of the systems envisaged is determined by the number of constituents and the many compromises necessary to best achieve the desired result.

For instance, ferric iron is one of the main substances that reduces luminous transmittance. A high content of ferric iron produces colouration and transmittance in yellow-brown colours. In order to obtain a more neutral shade, this colouring must be compensated using other colouring constituents in the composition.

Ferrous iron is an important element. It contributes a significant amount of the composition's power to absorb infrared radiation. While $Fe^{3+}$ ions lead to slight absorption of low-wavelength visible light (410 and 440 nm), the presence of $Fe^{2+}$ makes the glass highly absorbent for a band centred around a wavelength of 1050 nm. For this reason it is the $Fe^{2+}$ ions that control the energetic transmittance of glass. The increase in the concentration of ferrous iron is accompanied by a reduction in TE and an increase in the selectivity of the glass.

Total iron in the composition does not exceed 1.5% by weight and, preferably, does not exceed 1.35%. Similarly, while the content is not less than 1.1% by weight, it should preferably be at least 1.2%.

Taking account of the respective effects of ferrous iron and ferric iron, the ratio of ferrous iron to total iron expressed as ferric iron, which characterises the redox state of the composition, is preferably established according to the invention at a value:

$$0.20<F^{2+}/\text{total Fe}<0.26$$

and ideally at:

$$0.21<F^{2+}/\text{total Fe}<0.25$$

Besides iron, the effects of the various colouring agents taken individually to obtain a glass are as follows (according to "Glass" by H. Scholze—translated by J. Le Dû—Institute of Glass—Paris):

Cobalt: The $C^{II}O_4$ group produces an intense blue colouration, with a dominant wavelength almost opposite that given by the iron-selenium chromophore.

Chromium: The presence of the $Cr^{III}O_6$ group gives rise to absorption bands at 650 nm and produces a light green colour. More intense oxidation gives rise to a $Cr^{VI}O_4$ group which produces a very intense absorption band at 365 nm and gives a yellow colouration.

Selenium: The $Se^{4+}$ cation has practically no colouring effect, whereas the uncharged $Se^{o}$ element gives a pink coloration. The $Se^{2-}$ anion forms a chromophore with the ferric ions present, so giving the glass a brownish-red colour.

Manganese: This appears in glass in the form of practically colourless $Mn^{II}O_6$. However, alkali-rich glass has a violet colour owing to the $Mn^{III}O_6$ group.

Titanium: $TiO_2$ in glass gives a yellow coloration. For large quantities, the $Ti^{III}O_6$ group can even be obtained by reduction, which gives a violet or even brown colouring.

The energetic and optical properties of a glass containing several colouring agents therefore result from a complex interaction between them. Indeed, the behaviour of these colouring agents depends to a large extent on the redox state and hence on the presence of other elements that can influence that state.

Considerations other than those concerning the colouring properties of the these elements also influence the choice of the compositions according to the invention. For example, selenium should preferably be used in relatively small quantities in the compositions according to the invention. Selenium is difficult to introduce into the composition because it is highly volatile. Moreover, since the regulations governing atmospheric emissions are increasingly stringent, in order to avoid having to resort to costly elimination of selenium present in the fumes, it is preferable to keep its content as low as possible in the fumes and hence in the compositions themselves.

Selenium content does not exceed 50 ppm in the compositions. Its content should preferably be kept below 40 ppm and can even be as low as 20 ppm or even 10 ppm.

When MnO is present in the composition its content does not exceed 600 ppm. Chromium content should not exceed 100 ppm and should preferably not exceed 80 ppm, and can even be as low as 25 ppm.

Compositions according to the invention have a cobalt content between 150 and 200 ppm. It should preferably be between 160 and 190 ppm.

By adjusting the proportions of the various constituents as best as possible, the excitation purity, P, of the compositions coloured according to the invention, in other words the colour neutrality, which is always less than 10, should ideally not exceed 5. For certain compositions it is particularly preferable that it should not exceed 4.

The luminous transmittance, TLA4, of less than 20% can be reduced to significantly lower values, notably less than 19%. In the context of the invention, for the uses considered, whether automotive or building glass, TLA4 should preferably not be less than 14%.

It is best to keep the energetic transmittance of the glass according to the invention as low as possible. While it is always less than or equal to 20%, it is best such that the selectivity (TL/TE ratio) is greater than or equal to 1.

Glass according to the present invention may be manufactured using conventional techniques. Natural materials, recycled glass, slag or a combination of these materials can be used as raw materials. The colorants are not necessarily added in the form indicated, but this means of giving the quantities of added colouring agents, as equivalents in the forms indicated, corresponds to the usual practice. In practice, the iron is added in the form of rouge, the cobalt is added in the form of hydrated sulphate, such as $COSO_4.7H_2O$ or $CoSO_4.6H_2O$, the chromium is added in the form of dichromate such as $K_2Cr_2O_7$, or chromite such as $(Mg,Fe^{2+})O(Cr,Al,Fe^{3+})_2O_3$. The vanadium is introduced in the form of oxide or sodium vanadate. Any selenium present is added in elemental form or in the form of selenite such as $Na_2SeO_3$ or $ZnSeO_3$.

Other elements are sometimes present as impurities in the raw materials used to manufacture the glass according to the invention, whether in the natural materials, recycled glass or slag, but when these impurities do not give the glass properties outside the limits defined above, the glass is regarded as compliant with the present invention.

DETAILED DESCRIPTION OF THE INVENTION

The present invention will be illustrated by the following specific examples of optical properties and compositions.

| | 1 | 2 | 3 | 4 | 5 | 6 | 7 | 8 | 9 | 10 |
|---|---|---|---|---|---|---|---|---|---|---|
| Fe2O3 (%) | 1.1 | 1.15 | 1.232 | 1.238 | 1.273 | 1.273 | 1.285 | 1.29 | 1.296 | 1.31 |
| Co (ppm) | 175 | 185 | 181 | 178 | 184 | 184 | 176 | 195 | 185 | 150 |
| Cr2O3 (ppm) | 100 | 25 | 31 | 62 | 40 | 52 | 65 | 60 | 42 | 30 |
| Se (ppm) | 30 | 35 | 47 | 36 | 40 | 35 | 31 | 43 | 47 | 30 |
| FeO (%) | 0.248 | 0.259 | 0.212 | 0.261 | 0.286 | 0.268 | 0.280 | 0.290 | 0.222 | 0.295 |
| Fe2+/TotFe (%) | 25 | 25 | 19.1 | 23.4 | 25 | 23.4 | 24.2 | 25 | 19 | 25 |
| X | 0.298 | 0.302 | 0.316 | 0.310 | 0.312 | 0.305 | 0.303 | 0.313 | 0.304 | 0.310 |
| Y | 0.313 | 0.313 | 0.326 | 0.325 | 0.326 | 0.321 | 0.321 | 0.327 | 0.316 | 0.328 |
| TLA 4 mm (%) | 19.00 | 17.60 | 17.60 | 17.70 | 14.96 | 16.80 | 17.40 | 12.81 | 17.00 | 20.00 |
| TE 4 mm (%) | 18.90 | 17.85 | 19.90 | 17.30 | 15.04 | 16.60 | 16.60 | 13.84 | 19.30 | 16.90 |
| LOD (nm) | 487.8 | 485.5 | 570.0 | 547.1 | 561.1 | 504.6 | 498.4 | 563.5 | 489.8 | 550.8 |
| P (%) | 4.8 | 3.3 | 4.1 | 2.1 | 3.2 | 1.6 | 2.4 | 3.8 | 2.3 | 3.3 |

| | 11 | 12 | 13 | 14 | 15 | 16 | 17 | 18 | 19 |
|---|---|---|---|---|---|---|---|---|---|
| Fe2O3 (%) | 1.35 | 1.35 | 1.35 | 1.35 | 1.35 | 1.35 | 1.35 | 1.35 | 1.35 |
| Co (ppm) | 200 | 200 | 200 | 165 | 180 | 150 | 155 | 200 | 200 |
| Cr2O3 (ppm) | 25 | 25 | 25 | 30 | 50 | 80 | 100 | 100 | 100 |
| Se (ppm) | 35 | 35 | 35 | 25 | 35 | 30 | 21 | 35 | 35 |
| FeO (%) | 0.292 | 0.255 | 0.304 | 0.304 | 0.27945 | 0.304 | 0.304 | 0.255 | 0.304 |
| Fe2+/TotFe (%) | 24 | 21 | 25 | 25 | 23 | 25 | 25 | 21 | 25 |
| x | 0.302 | 0.306 | 0.300 | 0.298 | 0.310 | 0.311 | 0.296 | 0.306 | 0.301 |
| y | 0.316 | 0.319 | 0.315 | 0.317 | 0.327 | 0.333 | 0.320 | 0.324 | 0.319 |
| TLA 4 mm (%) | 14.32 | 15.18 | 14.04 | 19.32 | 16.00 | 18.70 | 20.00 | 14.01 | 12.87 |
| TE 4 mm (%) | 14.82 | 16.98 | 14.10 | 16.42 | 15.89 | 15.70 | 16.60 | 16.25 | 13.36 |
| LOD (nm) | 490.5 | 500.0 | 489.0 | 491.7 | 552.5 | 554.3 | 494.5 | 519.0 | 495.1 |
| P (%) | 3.2 | 1.5 | 3.8 | 4.5 | 3.1 | 4.9 | 5.0 | 1.5 | 3.2 |

The invention claimed is:

1. A glass of soda-lime type composition, comprising: basic components in the following proportions by weight,

| | |
|---|---|
| $SiO_2$ | 66 to 75% |
| $Na_2O$ | 10 to 20% |
| CaO | 5 to 15% |

-continued

| | |
|---|---|
| MgO | 0 to 5% |
| $Al_2O_3$ | 0 to 5% |
| $K_2O$ | 0 to 5% |

and colouring elements in the following proportions by weight,

| | |
|---|---|
| $Fe_2O_3$ | 1.1 to 1.5% (total iron in the composition) |
| Co | 150 to 200 ppm |
| $Cr_2O_3$ | 25 to 100 ppm |
| Se | 10 to 50 ppm |
| MnO | less than 600 ppm |
| $TiO_2$ | less than 0.1% |

wherein constituents of the composition are selected in such proportions that a luminous transmittance at a thickness of 4 mm, TLA4, is less than 20%, and an energetic transmittance, TE4 (Moon), is less than 20% and wherein a ratio of ferrous iron to total iron, representing a degree of oxidation of the composition, is: $0.20<Fe^{2+}/\text{total Fe}<0.26$.

2. The glass composition in accordance with claim 1, wherein $Cr_2O_3$ content does not exceed 80 ppm.

3. The glass composition in accordance with claim 1, wherein the Co content is between 160 and 190 ppm.

4. The glass composition in accordance with claim 1, wherein the Se content does not exceed 40 ppm.

5. The glass composition in accordance with claim 1, wherein total iron content does not exceed 1.35%.

6. The glass composition in accordance with claim 1, wherein a ratio of ferrous iron to total iron is:

$$0.21<Fe^{2+}/\text{total Fe}<0.25.$$

7. The glass composition in accordance with claim 1, wherein the content of total iron is at least 1.2%.

8. The glass composition in accordance with claim 1, wherein a degree of colour excitation purity does not exceed 5.

9. The glass composition in accordance with claim 1, wherein the luminous transmittance at a thickness of 4 mm, TLA4, does not exceed 19%.

10. The glass composition in accordance with claim 1, wherein a selectivity TL/TE>1.

11. The glass composition in accordance with claim 1, wherein the luminous transmittance at a thickness of 4 mm, TLA4, does not exceed 14%.

12. The glass composition in accordance with claim 8, wherein the luminous transmittance at a thickness of 4 mm, TLA4, does not exceed 14%.

13. The glass composition in accordance with claim 8, wherein the energetic transmittance, TE4 (Moon), is less than 17%.

14. The glass composition in accordance with claim 8, wherein the luminous transmittance at a thickness of 4 mm, TLA4, does not exceed 19%.

* * * * *